United States Patent
McLellan et al.

(10) Patent No.: US 10,286,324 B1
(45) Date of Patent: May 14, 2019

(54) SYSTEM AND METHOD FOR PROVIDING VIRTUAL ITEMS THROUGH VIRTUAL PURCHASES WITH A DECREASING SECONDARY VIRTUAL CURRENCY

(71) Applicant: Electronic Arts Inc., Redwood City, CA (US)

(72) Inventors: Sam McLellan, San Francisco, CA (US); Luc Pieron, San Francisco, CA (US); Stephanie Schultz, San Francisco, CA (US)

(73) Assignee: ELECTRONIC ARTS INC., Redwood City, CA (US)

(*) Notice: Subject to any disclaimer, the term of this patent is extended or adjusted under 35 U.S.C. 154(b) by 912 days.

(21) Appl. No.: 14/497,373

(22) Filed: Sep. 26, 2014

(51) Int. Cl.
*A63F 13/792* (2014.01)
*A63F 13/61* (2014.01)
*A63F 13/85* (2014.01)

(52) U.S. Cl.
CPC .......... *A63F 13/792* (2014.09); *A63F 13/61* (2014.09); *A63F 13/85* (2014.09)

(58) Field of Classification Search
CPC ......... A63F 13/792; A63F 13/85; A63F 13/61
See application file for complete search history.

(56) References Cited

U.S. PATENT DOCUMENTS

| | | | |
|---|---|---|---|
| 7,458,892 B2 | 12/2008 | Walker et al. | 463/25 |
| 8,221,223 B2 | 7/2012 | Walker et al. | 463/25 |
| 8,239,487 B1 | 8/2012 | Hoffman et al. | 709/218 |
| 8,287,383 B1 | 10/2012 | Etter | |
| 8,292,743 B1 | 10/2012 | Etter | |
| 8,382,581 B2 | 2/2013 | Fargo | 463/25 |
| 8,439,759 B1 | 5/2013 | Mello | |
| 8,443,039 B2 | 5/2013 | Hoffman et al. | 709/203 |
| 8,454,442 B2 | 6/2013 | Van Luchene | 463/42 |
| 8,469,801 B2 | 6/2013 | Ocko et al. | 463/25 |
| 8,510,413 B1 | 8/2013 | Hoffman et al. | 709/218 |
| 8,924,308 B1 | 12/2014 | Mehta | |

(Continued)

OTHER PUBLICATIONS

Kincaid, Jason, "Bodega: A Cross-Platform Marketplace That Lets Gamers Swap Virtual Currencies for Cash", URL: <https://techcrunch.com/2009/11/04/bodega-a-cross-platform-marketplace-that-lets-gamers-swap-virtual-currencies-for-cash/>, Nov. 4, 2009, 2 pages.

(Continued)

*Primary Examiner* — Jasson H Yoo
(74) *Attorney, Agent, or Firm* — Knobbe, Martens, Olson & Bear, LLP (57) ABSTRACT

A decreasing secondary virtual currency is used in a system for providing virtual items through virtual purchases. Physical processors may be configured by machine readable instructions to execute the online game, manage user accounts, effectuate presentation of offers to sell primary and secondary virtual currencies, decrease the virtual currencies over time, and effectuate presentation of offers to sell virtual items. User accounts may include virtual inventories of virtual items and virtual currency balances. The user may be presented with offers to buy virtual currency which includes a primary virtual currency component and a secondary virtual currency component. The secondary virtual currency component may decrease over time. Certain virtual items of the online game may only be purchasable with the secondary virtual currency.

26 Claims, 4 Drawing Sheets

(56) References Cited

U.S. PATENT DOCUMENTS

| | | | |
|---|---|---|---|
| 9,582,965 B1 | 2/2017 | Schultz et al. | |
| 9,665,239 B1 | 5/2017 | Koh et al. | |
| 9,666,029 B1* | 5/2017 | Yu | G07F 17/3255 |
| 2002/0072412 A1 | 6/2002 | Young et al. | 463/42 |
| 2002/0077169 A1 | 6/2002 | Kelly et al. | 463/16 |
| 2003/0003983 A1* | 1/2003 | Walker | G06Q 30/0209 |
| | | | 463/16 |
| 2006/0089874 A1* | 4/2006 | Newman | G06Q 30/02 |
| | | | 705/14.32 |
| 2006/0178966 A1 | 8/2006 | Jung | |
| 2007/0111770 A1* | 5/2007 | Van Luchene | A63F 13/12 |
| | | | 463/7 |
| 2007/0167210 A1 | 7/2007 | Kelly et al. | 463/16 |
| 2007/0243928 A1 | 10/2007 | Iddings | 463/26 |
| 2008/0090659 A1 | 4/2008 | Aguilar | |
| 2009/0029769 A1 | 1/2009 | Muller | |
| 2009/0164287 A1 | 6/2009 | Kies et al. | 705/8 |
| 2009/0247282 A1 | 10/2009 | Cheng | 463/25 |
| 2009/0313556 A1 | 12/2009 | Hamilton, II | |
| 2010/0121729 A1 | 5/2010 | Betzler | |
| 2010/0223115 A1 | 9/2010 | Chodosh et al. | 705/14.12 |
| 2011/0264489 A1 | 10/2011 | Ganetakos et al. | 705/12 |
| 2011/0300923 A1 | 12/2011 | Van Luchene | |
| 2011/0302037 A1 | 12/2011 | Sutton-Shearer | 705/14.66 |
| 2011/0312423 A1* | 12/2011 | Mosites | G06Q 10/00 |
| | | | 463/42 |
| 2011/0319169 A1* | 12/2011 | Lam | A63F 13/792 |
| | | | 463/42 |
| 2012/0122586 A1 | 5/2012 | Kelly et al. | 463/42 |
| 2012/0157212 A1 | 6/2012 | Kane et al. | 463/42 |
| 2012/0178515 A1 | 7/2012 | Adams et al. | 463/17 |
| 2012/0225723 A1 | 9/2012 | Webster et al. | 463/42 |
| 2012/0244950 A1 | 9/2012 | Braun | 463/42 |
| 2012/0259698 A1 | 10/2012 | Yurow | 705/14.51 |
| 2012/0265604 A1 | 10/2012 | Corner et al. | 705/14.39 |
| 2012/0289330 A1 | 11/2012 | Leydon | |
| 2012/0289346 A1 | 11/2012 | Van Luchene | 463/42 |
| 2012/0323683 A1 | 12/2012 | Feldman et al. | 705/14.53 |
| 2012/0329560 A1 | 12/2012 | Kelly et al. | 463/42 |
| 2013/0036064 A1 | 2/2013 | Osvald et al. | 705/319 |
| 2013/0036373 A1 | 2/2013 | Alderfer | |
| 2013/0046621 A1 | 2/2013 | Asseoff et al. | 705/14.51 |
| 2013/0072308 A1 | 3/2013 | Peck et al. | 463/42 |
| 2013/0079131 A1 | 3/2013 | Lam | |
| 2013/0079145 A1 | 3/2013 | Lam | |
| 2013/0130781 A1 | 5/2013 | Anderson | |
| 2013/0138489 A1 | 5/2013 | Fargo | 705/14.12 |
| 2013/0159086 A1 | 6/2013 | Richard | 705/14.33 |
| 2013/0184075 A1* | 7/2013 | Kim | A63F 13/537 |
| | | | 463/31 |
| 2013/0226694 A1 | 8/2013 | Boyd et al. | 705/14.49 |
| 2013/0231999 A1 | 9/2013 | Emrich et al. | 705/14.43 |
| 2013/0252727 A1 | 9/2013 | Ocko et al. | 463/29 |
| 2013/0267308 A1 | 10/2013 | Walker | |
| 2013/0339111 A1 | 12/2013 | Ross et al. | 705/14.12 |
| 2013/0344968 A1 | 12/2013 | Halfteck et al. | 463/43 |
| 2014/0080590 A1 | 3/2014 | Link et al. | 463/27 |
| 2014/0128153 A1 | 5/2014 | Driemeyer et al. | 463/25 |
| 2014/0141869 A1* | 5/2014 | Shore | G07F 17/3255 |
| | | | 463/25 |
| 2014/0164142 A1 | 6/2014 | Yang | 705/14.69 |
| 2014/0194197 A1 | 7/2014 | Graziosi et al. | 463/29 |
| 2014/0248943 A1 | 9/2014 | Burgin et al. | 463/29 |
| 2015/0056949 A1* | 2/2015 | Matsumura | H04M 3/38 |
| | | | 455/406 |

OTHER PUBLICATIONS

Bodega: Cross Platform Virtual Marketplace, URL: <http://tech.co/bodega-cross-platform-virtual-marketplace-2010-04>, Apr. 12, 2010, 2 pages.

SwapMob Raises $1M for In-Game Virtual Goods Marketplace (Exclusive), URL: <http://venturebeat.com/2013/07/25/swapmob-raises-1m-for-in-game-virtual-goods-marketplace/>, 3 pages.

World of Warcraft published by Blizzard Entertainment on Nov. 23, 2004 (see attached screenshot); YouTube video "Wow Feenix Trade faker" uploaded on Jan. 6, 2011 by Gyorgy Schweitzer (https://www.youtube.com/watch?v=CrCht0XAdMA) (see attached screenshot), 2 pages.

Ann Arbor's BodegaBid Bets There's Real Profit in Virtual Currency, URL: <http://www.xconomy.com/detroit-ann-arbor/2010/11/08/ann-arbors-bodegabid-bets-theres-real-profit-in-virtual-currency/>, 3 pages.

* cited by examiner

SYSTEM AND METHOD FOR PROVIDING VIRTUAL ITEMS THROUGH VIRTUAL PURCHASES WITH A DECREASING SECONDARY VIRTUAL CURRENCY

FIELD OF THE DISCLOSURE

The disclosure relates to distributing a secondary virtual currency with purchases of a primary virtual currency associated with an online game, the secondary virtual currency being usable to purchase virtual items in the online game, and the secondary virtual currency being subject to automated reduction over time.

BACKGROUND

Typically, virtual items are presented in an online game. Many online games and app-based games are free-to-play games which provide users the opportunity to enhance the game by purchasing one or more virtual items which are useable in the online game. Often times a player of an online game will be provided with an opportunity to purchase virtual currency in exchange for real world currency. Players may then exchange the virtual currency for virtual items within the online game.

The distribution of virtual currency in exchange for real currency (e.g. fiat currency) may be focused on the exchange rate for the virtual currency in the online game. The user may receive a discounted virtual currency exchange rate if the user buys more virtual currency, for example. The discounted exchange rate has the effect of incentivizing the user to spend more fiat currency in order to maximize the virtual currency obtained.

SUMMARY

One aspect of the disclosure relates to distributing a secondary virtual currency with purchases of a primary virtual currency associated with an online game. The secondary virtual currency may only be obtainable through such distributions. The secondary virtual currency may be used to purchase virtual items that are usable in the online game. One or more virtual items usable in the online game may only be purchased using the secondary virtual currency. One or more virtual items usable in the online game may only be purchased using both the primary virtual currency and the secondary virtual currency in conjunction in the same purchase transaction. Subsequent to distribution of the secondary virtual currency to a user, an amount of secondary virtual currency held by the user may be decreased over time. This may be conceptualized as a virtual currency with a "use it or lose it" property. This decrease in the amount of secondary virtual currency held by the user may encourage the user to make purchases with the secondary virtual currency, may encourage the user to purchase more primary virtual currency in order to replenish the amount of held secondary virtual currency, and/or may have other impacts.

A system configured to distribute the secondary virtual currency may be configured to host the online game. This may include hosting a virtual space in which the online game may take place. The server(s) may be configured to communicate with one or more client computing platforms according to a client/server architecture. The user of the system may access the online game and/or the virtual space, (e.g., a virtual world, a game space, an online game, etc.) via the client computing platform(s). The system may comprise one or more physical processors configured by machine-readable instructions to facilitate participation by multiple users in an online game through client computing platforms associated with the users. The server, and/or other portions of the system, may include one or more computer processors configured to execute components of the online game and/or virtual space. The components may include one or more of a game component, a user component, a virtual currency shop component, a currency balance adjustment component, a virtual item shop component, an offer configuration component, and/or other components.

The game component may be configured to execute an instance of an online game. User participation of users in the online game may be facilitated by the game component. The online game may be implemented in virtual space. The transmission of information related to the instance of the online game to client computing platforms may be effectuated by the game component. Client computing platforms may be configured to display views of the online game. Client computing platforms may be configured to present the views of the online game in virtual space to users. The game component may be configured to facilitate user participation of one or more user associated client computing platforms in an online game.

The user component may be configured to manage user accounts. The user accounts may be associated with the users. The user accounts may include indications of the users' virtual inventories, virtual currency balances, and/or other relevant information to the user of the online game. For an individual user, the virtual currency balances included in the user account associated with the individual user may include a primary virtual currency balance, a secondary virtual currency balance, and/or other currency balances. An inventory included in the user account associated with the individual user may include a list of one or more virtual items available for use by the individual user within the online game.

Virtual currency shop component may be configured to effectuate presentation of offers to sell virtual currency to the users on the client computing platforms associated with users. Virtual currency shop component may be configured to facilitate user specification and/or entry by the users of an acceptance of the offer. For example, a user may specify an amount of virtual currency to purchase in response to an offer to sell virtual currency at a specified exchange rate for fiat currency. Changing the user specified amount of virtual currency may alter the fiat currency exchange rate for the virtual currency. The rate of decreasing the secondary virtual currency balance may be adjusted by the amount of fiat currency exchanged for the virtual currency. The virtual currency purchase may include a primary virtual currency exchanged for fiat currency wherein a secondary virtual currency is provided subsequent to the exchange. The amount of secondary virtual currency may include a percentage of the primary virtual currency purchased. The secondary virtual currency may be directly exchanged for fiat currency.

Currency balance adjustment component may be configured to effectuate adjustment to the virtual currency balances of a user. The currency balance adjustment component may be configured to effectuate a decrease in secondary virtual currency balances over time. Subsequent to addition of the purchased amount of secondary virtual currency to the secondary virtual currency balance, the secondary virtual currency balance may be reduced over time. Adjustments to the virtual currency balances may be made in real world time and/or virtual time. Adjustments to the virtual currency balances may be made in discrete periodic amounts (e.g.

$100/week) and/or a continuous reduction adjustment. Periodic and/or continuous adjustments may be linear, exponential, first order, second order, and/or follow other adjustment schedules.

The virtual currency balance of a user of the online game may include a primary virtual currency balance and a secondary virtual currency balance. The secondary virtual currency balance may decrease over time. Some virtual items may only be exchanged for a decreasing currency (e.g. the secondary virtual currency). The secondary virtual currency balance may decrease in discrete quantities at specified times. Some virtual items may be provided in a virtual item shop. Virtual items may be available for exchange of virtual currency, including the primary and the secondary currencies. Virtual items that may only be purchased with secondary virtual currency may include new content of the online game and/or other new features of the online game. New content may contain enhanced powers or features accessible to the user of the online game in exchange for the required amount of secondary virtual currency.

Virtual items shop component may be configured to effectuate presentation of offers to sell virtual items to the users on the client computing platforms associated with users. Virtual items shop component may be configured to facilitate selection and/or entry by the users of an acceptance of the offer. For example, an offer to sell virtual items may be presented to the user and the user may specify, select, and/or enter their desire to accept the offer. Some virtual items may only be purchased with secondary virtual currency. Some virtual items may have a benefit level associated with how the virtual item was purchased. For example, a virtual item purchased with primary virtual currency may be less powerful than a virtual item purchased with secondary virtual currency. A virtual item may become available in the game entities inventory more quickly if the virtual item is purchased in exchange for secondary virtual currency.

The offers to sell virtual items may include an associated user cost, such that the offer to sell virtual items includes an associated user cost. The amount of the associated user cost of the offer to sell virtual items may vary with the virtual currency used. Such that, the primary virtual currency user cost for an offer to sell virtual items varies with the amount of secondary virtual currency is included in the offer. The more secondary virtual currency offered, the lower the associated cost of the offer. Thereby incentivizing the user to expend more secondary virtual currency and/or accept the offer to sell.

The virtual items in the offers to sell virtual items may include a set of potential awards having a set of award probabilities. The system may stochastically or quasi-stochastically select a first potential award from the set of potential awards as an actual award for distribution to users who have accepted the offer. The set of potential awards may include a desired award, such as a rare virtual item, or a virtual item having a usually high associated user cost. Virtual currency including secondary virtual currency may be included in a potential award.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
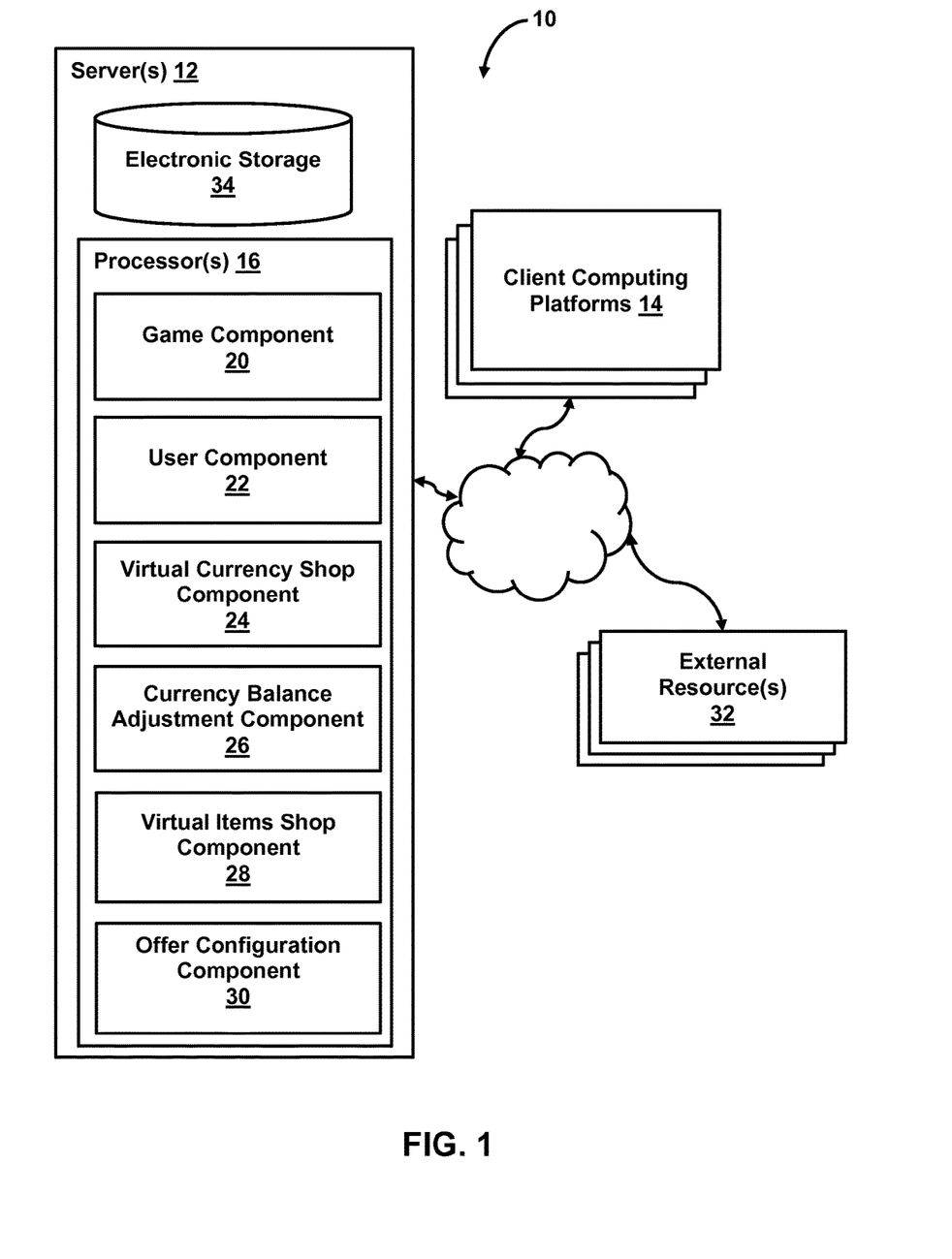
FIG. 1 illustrates a system configured for providing virtual items through virtual purchases with a decreasing secondary virtual currency, in accordance with one or more implementations.

FIG. 1 illustrates a system 10 configured for distributing a secondary virtual currency with purchases of a primary virtual currency associated with an online game. The secondary virtual currency may only be obtainable through such distributions. Game component 20 may host an online game that may provide virtual items for purchase with the secondary currency. The virtual items may be usable in the online game. The secondary virtual currency may be used to purchase virtual items that are usable in the online game. Some virtual items may only be purchased using the secondary virtual currency. Some virtual items may only be purchased using both the primary virtual currency and the secondary virtual currency in conjunction in the same purchase transaction. An amount of secondary virtual currency held by the user may be decreased over time subsequent to distribution of the secondary virtual currency. The decreasing secondary virtual currency may be conceptualized as a virtual currency with a "use it or lose it" property. The user may encouraged to make purchases with the secondary virtual currency, to purchase more primary virtual currency in order to replenish the amount of held secondary virtual currency, and/or may have other impacts because the secondary virtual currency decreases over time.

The virtual space of the online game may be hosted over a network. Providing the virtual space may include hosting the virtual space over a network. System 10 may include a server 12. The server 12 may be configured to communicate with one or more client computing platforms 14 according to a client/server architecture. The users may access system 10 and/or the virtual space via client computing platforms 14.

The server 12 may include one or more processors 16, electronic storage 34, and/or other parts. Processor 16 may be configured to execute one or more computer program components. The computer program components may include one or more of a game component 20, a user component 22, a virtual currency shop component 24, a currency balance adjustment component 26, a virtual item shop component 28, an offer configuration component 30, and/or other components.

An instance of an online game may be executed by game component 20. User participation in the online game may be facilitated by the game component. The online game may be implemented in virtual space. The transmission of information related to the instance of the online game to client computing platforms may be effectuated by the game component. Client computing platforms may be configured to display views of the online game. Client computing platforms may be configured to present the views of the online game in virtual space to users. The game component may be configured to facilitate user participation of one or more user associated client computing platforms in an online game.

A virtual space may be used to implement the online game. As used herein, virtual space, game space, and online game may be synonymous. Game component 20 may be configured to implement the instance of the virtual space executed by the client computing platforms 14 and/or computer program components to determine a state of the virtual space. The state of the virtual space may then be communicated (e.g., via streaming visual data, via object/position data, and/or other state information) from server 12 to one or more user associated client computing platforms 14 for presentation to the user(s).

The state of the virtual space may be determined by game component 20 and transmitted to a given client computing platform 14 associated with the user. The state may correspond to a view for a game entity (e.g. a user character) being controlled by a user via the given client computing platform 14. For example, the state determined and transmitted to a given client computing platform 14 may correspond to the game entities location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be specified and/or configured by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which state of the virtual space is determined by game component 20 is not intended to be limiting. The game component 20 may be configured to express the virtual space in a more limited and/or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Within the same virtual space, for example, one generic battle graphic may have a more limited expressed representation and a view of the virtual battle which expresses a rich view representation. Other expressions of individual places within the virtual space are contemplated.

Game component 20 may be configured to execute an instance of an online game. Within the instance(s) of the virtual space executed by game component 20, users may control game entities including: game entities, objects, simulated physical phenomena (e.g., wind, rain, earthquakes, and/or other phenomena), and/or other game entities. Game entities may interact within the virtual space with the virtual space and/or other game entities. Game entities may include avatars. Game component 20 may effectuate transmission of information related to the instance of the online game to client computing platforms 14. Client computing platforms 14 may be configured to display views of the online game and/or present the views to users. Game component 20 may be configured to facilitate user participation of multiple users in an online game through user associated client computing platforms 14.

The game entity may be controlled by the associated user. The game entities of a game entity may include user controlled element(s) that may move through and interact with the virtual space (e.g., non-user game entities in the virtual space, other objects in the virtual space). The user controlled game entities may be controlled, created, and/or customized by the associated user. The user may have an "inventory" of virtual items and/or virtual currency that the game entity of the user can use (e.g., by manipulation of a game entity, user character, and/or other user controlled element, and/or other items) within the virtual space.

Game component 20 may facilitate user participation of one or more users in the online game. The users may participate in the instance of the virtual space by controlling one or more of the available game entities and/or user controlled elements in the virtual space. Control may be exercised through control inputs and/or commands input by the users through client computing platforms 14. Multiple users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through game component 20).

The instance of the virtual space and/or the game that takes place therein may be persistent. That is, the virtual space and/or the game may continue on whether or not individual players are currently logged in and/or participating in the game. A user and/or player that logs out of the virtual space and then logs back in some time later may find the virtual space has been changed through the interactions of other players with the virtual space during the time the user and/or player was logged out. The persistent nature of these games may create a virtual time component of the game. For example, a 24 hour period of real world time may represent 10 years in the virtual time of the online game. The virtual games persistence may give rise to a concept of virtual time. In the example above, the 24 hour period of time may be measured in real world time and the corresponding 10 years in the virtual space may be measured in virtual time.

As a result, the user may perceive changes that may be made to the game entity, the game entity's inventory, the game entity's virtual currency balances, and/or other changes during a period of virtual time that the user may be logged out of the online game. When the user returns, changes to the virtual space, the game entity's inventory, virtual currency balance, and/or other changes, may affect the users perception of the virtual space instance of the online game. For example, the game entity's inventory and/or the virtual currency balance may be adjusted for the elapsed virtual time that the user was logged out. The secondary virtual currency balance of the user may be decreased in virtual time. Other adjustments may include changes to the simulated physical space, changes in the user's inventory, changes in the player's virtual currency balance, changes in other player's inventories, changes experienced by non-user game entities, and/or other changes. The adjustments may increase, decrease, or be equal to the game entities previous inventory and/or virtual currency balances.

User component 22 may be configured to access and/or manage one or more user accounts and/or user information associated with users of the system 12. User information may include information stored by server 12, one or more of the client computing platforms 14, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual item inventory, virtual currency balance information, including primary virtual currency balance and secondary virtual currency balance (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to the user.

The user component 22 may be configured to monitor interactions of the users within the virtual space. This may include monitoring, for a given user, one or more times the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction component in monitoring the interactions of the users may be stored to the user accounts managed by user component.

User component 22 may be configured to manage user accounts. User accounts include user information associated with the user(s). The user(s) information may include information of the user account that is stored on server 12. The user accounts may be associated with the user, game entities of the user, the users' game entities, and/or other entities associated with the user of the online game. The user accounts may include inventories of virtual items and virtual currency balances associated with the individual users of an online game. The virtual currency balances may include a primary virtual currency balance and a secondary virtual currency balance. The primary virtual currency balance may include an amount of primary virtual currency available to the user. The secondary virtual currency balance may include an amount of secondary virtual currency available to the user. For example, the user accounts of a first game entity may include a first user account for a first user including a user/game entity inventory and a virtual currency balance which includes a first primary virtual currency balance and a first secondary virtual currency balance.

Virtual currency shop component 24 may be configured to facilitate presentations of offers to sell virtual currency to an online game user, on the associated client computing platform 14 of the user. An offer may include one or more of an amount of primary virtual currency, a cost, and/or other information. An offer may include an amount of secondary virtual currency that would be received, a cost, and/or other information. For example, the offer may include only a primary virtual currency but on acceptance the user may be provided or gifted an amount of secondary virtual currency. The offer may include both an amount of primary virtual currency and an amount of secondary virtual currency. In response to acceptance by the user of the offer to sell virtual currency, the primary virtual currency amount may be added to the users primary virtual currency balance. Acceptance by the user of an offer to sell virtual currency may result in an amount of secondary virtual currency being added to the secondary virtual currency balance of the user.

An offer of primary and/or secondary virtual currency may include a cost in exchange for the virtual currency. The cost may be presented to the user of the online game. The cost may be required to be paid in exchange for receipt of the virtual currency. The cost may be for real world consideration. Real world consideration may include fiat currency, virtual currency, virtual items, trades, services, referrals (e.g. adding new users to the game), a shared cost divided among several online game users, and/or other costs required in exchange for the virtual currency.

Virtual currency shop component 24 may be configured to establish exchange rates of virtual currency for fiat currency. For example, fiat currency may be exchanged for primary and/or secondary virtual currency based on the established exchange rate of the virtual currency. Such exchange rates may include reduced exchange rates when the user specifies a purchase of a greater amount of virtual currency in exchange for fiat currency. Exchange rates may decrease if a user invites friends to play the online game. The virtual currency shop component 24 may establish an exchange rate for primary virtual currency, secondary virtual currency, and/or other exchange rates for virtual currencies. Exchange rate relationships of the secondary virtual currency may be based on the amount of time until the secondary virtual currency decreases. When a user spends more fiat currency, for example, the rate at which the secondary virtual currency decreases may be delayed. For example, if a user spends more on a secondary virtual currency purchase, the secondary virtual currency may be reduced over time more gradually. The secondary virtual currency may be decremented based on the amount of fiat currency a user exchanges for the secondary virtual currency. the secondary virtual currency may be gifted to a user subsequent to a primary virtual currency exchange. The exchange for virtual currency may include real world consideration. Real world consideration may include currency, trades, services, and/or other forms of consideration.

Figure 2:
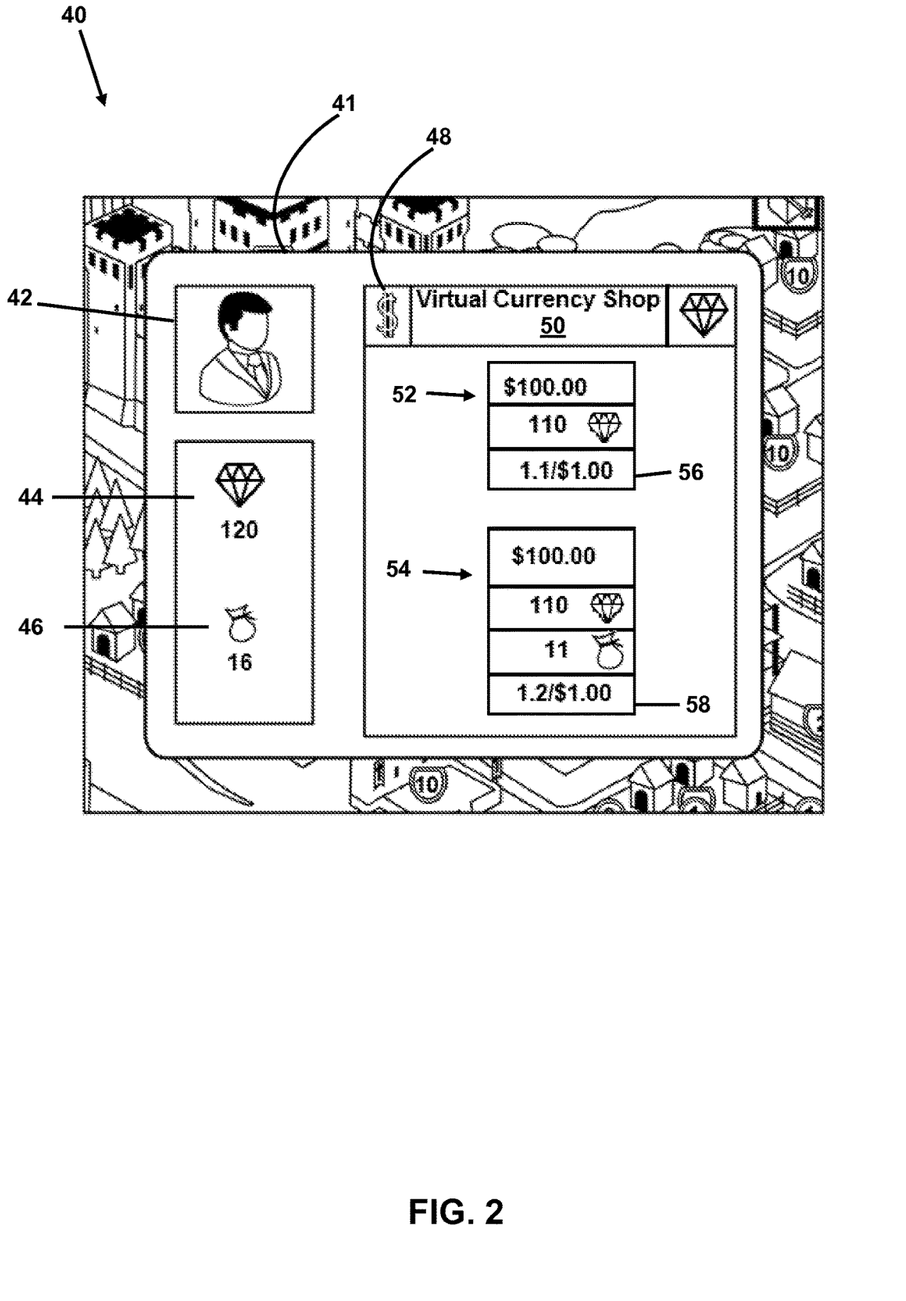
FIG. 2 illustrates an implementation of a virtual currency shop for purchasing virtual currencies.

FIG. 2 illustrates a user interface 40 presented to users on one or more client computing platforms 14 (as shown in FIG. 1). A virtual currency shop 50 component like virtual currency shop component 24 (as shown in FIG. 1), may be configured to cause the user interface 40 to facilitate the presentation of views of a virtual currency exchange shop 41 to users of the virtual space. The user interface 40 may provide a representation of an online game to the user. Within the representation of the online game a user may cause entry and/or selection of an indication of a desire to enter the virtual currency exchange shop interface 41. In response to an interaction by the user of the online game, the virtual currency shop 50 may be configured to effectuate presentation of a virtual currency exchange shop interface 41 to users. Virtual currency shop 50 may be presented in conjunction with presentation of views of the online game. The virtual currency exchange shop interface 41 may be configured to facilitate presentations to users of offers to sell virtual currencies to the users on the client computing platforms 14 associated with the users. The virtual currencies may be usable within the game.

The virtual currency exchange shop interface 41 may include information relating to a user including a game entity 42 associated with the user, a primary virtual currency balance 44, a secondary virtual currency balance 46, and/or other information related to the user of the online game. FIG. 2 illustrates a presentation of two offers for virtual currency in exchange for fiat currency 48 within virtual currency shop 50. In the first offer 52, 110 gems of primary virtual currency are offered in exchange for $100.00 of fiat currency 48. A first exchange rate 56 may be provided for this offer. The first offer 52 may include an amount of secondary virtual currency (e.g. gold) that is not communicated in the offer but may be provided to the user subsequent to the users acceptance of the first offer. In the second offer 54, 110 gems of primary virtual currency and 11 units of secondary virtual currency (e.g. gold) are offered in exchange for $100 of fiat currency 48. A second exchange rate 58 may be provided for the second offer. Some of the information relating to an offer may or may not be presented to the user of the online game including: the exchange rates, the amount of secondary currency to be provided on acceptance of the offer and/or other information.

The presentation to users of an offer to sell virtual currencies may comprise an indication of the virtual currency (e.g. primary and/or secondary currencies) associated with the offer indication of the associated user cost (e.g. virtual currency exchange rate for fiat currency), and/or other information. The associated user cost or exchange rate may include an amount of virtual currency, real currency, fiat currency, real world consideration, one or more virtual items, and/or other items available to the user to exchange for the offer. Virtual currency, including primary and secondary virtual currencies, may take any form. For example, virtual currency may be in the form of gems, stones, metals, credits, dollars, and/or any other representation of virtual currency.

Returning to FIG. 1, currency balance adjustment component 26 may be configured to adjust virtual currency balances of a user, on the client computing platform of the user. The currency balance adjustment component 26 may be configured to adjust the virtual currency balances of a game entity of the user. Currency balance adjustment component 26 may be configured to decrease secondary virtual currency balances over time. Secondary virtual currency balances may adjust over time such that subsequent to addition of a purchased amount of secondary virtual currency to the secondary virtual currency balance, the secondary virtual currency balance is reduced.

The amount of real world consideration and the exchange rate of virtual currency for the real world consideration may define the purchasable amount of secondary virtual currency. The purchased amount of secondary currency is the initial amount of secondary currency following user exchange for virtual currency. The purchased amount may be initially added to the users secondary currency balance. Subsequent to the initial purchase currency balance adjustment component 26 may be configured to adjust the secondary currency balance of a user.

Adjustments may be made in real world time, virtual time and/or other measurements of time. Adjustments may be discrete periodic amounts (e.g. 100 gems/week). As used herein, the word "gems" means a unit of virtual currency. Adjustments may be continual reduction adjustments. Reduction adjustments, either periodic or continuous, may include linear decay, exponential decay, first order decay, second order decay, and/or other decreasing methods.

Currency balance adjustment 26 may increase secondary virtual currency balances. Because the secondary virtual currency may decrease over time the secondary virtual currency may have increased buying power for purchasing virtual items. For example, secondary virtual currency may not be included in the offer or purchased directly. Virtual currency shop component 24 may only sell primary virtual currency. In such an example, the currency balance adjustment component 26 may adjust the primary virtual currency by adding the amount of primary virtual currency purchased to the primary virtual currency balance and adding to the secondary virtual currency balance a percentage of the amount primary virtual currency purchased. The secondary virtual currency may be determined as a percentage, fraction, a function of the purchase price, and/or other methods of determining the amount of secondary virtual currency based on the amount of primary virtual currency purchased.

The virtual item shop component 28 may be configured to effectuate presentation of offers to sell virtual items to the users on the client computing platforms 14 associated with users. The virtual item shop component 28 may be configured to facilitate selection and/or entry by the users of an acceptance of the offer. The virtual item shop component 28 may present a virtual store interface. The virtual store interface may include offers to sell virtual items and/or sets of virtual items in exchange for virtual currency that are usable in the online game. The offers to sell virtual items may comprise (i) a first offer to sell virtual items that specifies a cost in the secondary virtual currency, and (ii) a second offer to sell virtual items that specifies a cost in the primary virtual currency. The cost of a virtual item may only be presented to the user in the secondary virtual currency. The virtual item may only be purchased with the secondary virtual currency. A percentage of primary virtual currency may be converted into secondary virtual currency with an established virtual currency exchange rate, in order to accomplish the sale of the desired virtual item(s).

Some virtual items may only be purchasable using both the primary virtual currency and the secondary virtual currency in conjunction within the same purchase transaction. The virtual item may be discounted if more secondary virtual currency is used. The secondary virtual currency may be used to establish a time limit to purchase a virtual item following a virtual currency exchange. For example, the virtual item may be available as newly released content of the online game. In this example, purchasing sufficient virtual currency may provide the user with ample primary and secondary virtual currency to purchase the new content within the next 24 hours. Such a virtual item may only be purchased with some amount primary virtual currency and some amount of secondary virtual currency in the same transaction. This may have the effect of making certain virtual items available for purchase for a specified period of time after a virtual currency exchange sale. The example may also motivate the user to make an exchange of the virtual currency for the virtual items offered. The benefit derived from the virtual items may be correlated with the amount or percentage of primary virtual currency and the amount or percentage of secondary virtual currency was involved in the exchange.

Figure 3:
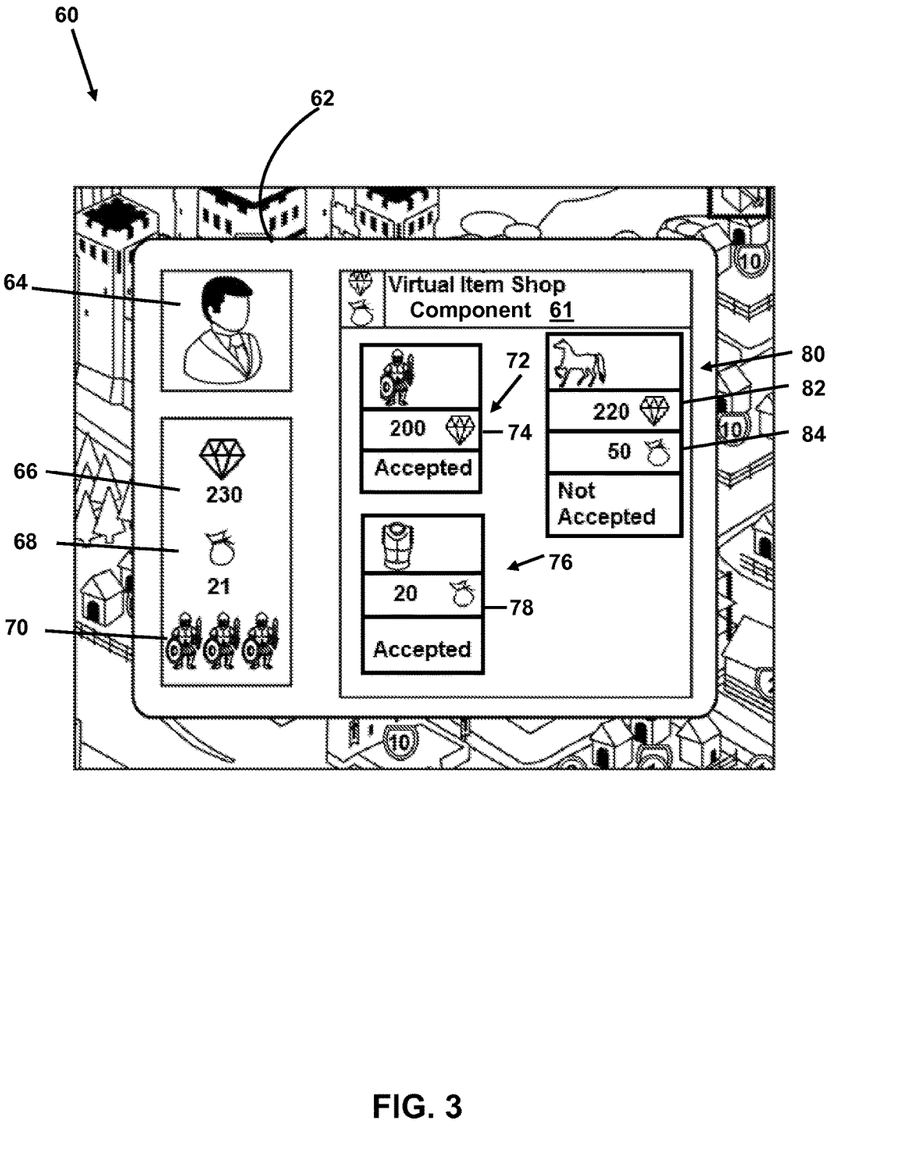
FIG. 3 illustrates an implementation of a virtual item shop, for purchasing virtual items.

Within the presentation of the virtual shop interface 42, user information may be provided such a representation of the user's avatar 44 and/or identifying information 46 of the user which may include one or more attributes and/or game play metrics 48 of the user. For example, one or more attributes and/or game play metrics 48 of the user may comprise an indication of the amount of virtual currency held in credit for the user, an indication of the inventory of the user, an indication of levels of one or more parameters of the user, such as strength, speed, skill, power, special abilities and/or other parameters. The shop interface 42 may comprise one or more tabs. Tabs may be panels, views, control buttons, and/or other graphical representation of one or more groupings within the virtual shop. One tab may be a virtual currency tab 54 indicating that the user may obtain virtual currency for using in the online game. Other tabs may include a virtual items tab 56 indicating offers to sell virtual items to users wherein the virtual items are usable in the online game by the user. Virtual items usable in the online game may be broken down further by category or type, such as weapons, tools, clothing, food, resources, buildings, and/or other virtual item categories within the virtual space and/or online game. Another tab may be an inventory tab 58 providing an indication of the virtual items the user has in their inventory. An inventory associated with a user may be stored in a user account for the user managed by the user component 22. When the shop component 28 is causing the virtual shop interface 42 to present offers to users to sell virtual currency in exchange for consideration, wherein the consideration is an amount of real currency, the virtual item shop component 28 may be supported by an e-commerce component configured to facilitate obtaining real world currency from the users for the online game provider.

A benefit provided to users by one or more virtual items may be an increase in the user's and/or a user game entity's strength, power, skill, and/or abilities compared to other users of the virtual space. For example, a user may have one or more associated troop units with the benefit provided to the user being a defensive benefit, an offensive benefit, and/or other military benefits within the game. As another example, a user may be one or more resource gathering units with the benefit provided to the user being a resource gathering benefit, and/or other benefits provided within the game.

The benefit level associated with a benefit provided by the virtual items of the offer to sell virtual items may vary based on the virtual currency that was used to purchase the virtual item. For example, the virtual items purchased with the offer to sell virtual items for primary virtual currency may include a first benefit level associated with a first benefit provided to the user. Virtual items purchased with the offer to sell virtual items for secondary virtual currency may include a second benefit level associated with a second benefit provided to the user. The first benefit level may be less than the second benefit level. In such implementations, the power or benefit of the virtual item may be reduced if it is purchased with the primary virtual currency instead of the secondary virtual currency. For example, an increased number of troops may be exchanged for secondary virtual currency than would be offered for primary virtual currency. In this example, the increase provides benefits to the user. The benefit may be a defensive benefit, an offensive benefit, and/or other military benefits within the game. As another example, where the virtual item may be a resource gathering unit, the greater the amount of secondary virtual currency used by the users the greater the ability of the resource gathering to gather resources. This implementation may encourage the user to expend secondary virtual currency more rapidly, thereby increasing the benefit to the user.

The benefit of a virtual item may be made available to a user more quickly if secondary virtual currency is used to purchase the item. For example, a virtual exchange of secondary virtual currency for a virtual item may reduce a time delay before the user is able to use the virtual item. The time may be reduced in real world time and/or in virtual world time.

The virtual items associated with the offers to sell virtual items may have one or more benefit levels associated with a benefit provided to users. A benefit provided to the users game entity by one or more virtual items may be an increase in the game entity's strength, power, skill, and/or abilities compared to other users of the virtual space. For example, a user may have one or more associated troop units with the benefit provided to the user being a defensive benefit, an offensive benefit, and/or other military benefits within the game. As another example, a user may be one or more resource gathering units with the benefit provided to the user being a resource gathering benefit, and/or other benefits provided within the game.

The benefit level associated with a benefit provided by the virtual items of the offer to sell virtual items may vary with the amount of users having a common affiliation that have accepted the offer. The virtual items of the first offer to sell virtual items may include a first benefit level associated with a first benefit provided to a first user. The first benefit level of the first offer may vary with the amount of users having the first affiliation whom accept the first offer. In some instances, the more users having a first affiliation that accept the offer, the higher the benefit level of the virtual item associated with the offer. In such implementations, every time a user from a first affiliation accepts an offer to purchase, say, troops, the number of troops received increases by a defined amount, such that all users of the first affiliation who have accepted the offer to purchase troops receive the increased number of troops. An increase in the number of troops may increase the benefit provided to the user, wherein the benefit may be a defensive benefit, an offensive benefit, and/or other military benefits within the game. As another example, where the virtual item is a resource gathering unit, the greater the number of users of an affiliation that accept the offer the greater the ability of the resource gathering to gather resources, thereby increasing the benefit to the user.

FIG. 3 illustrates a user interface 60 presented to users on one or more client computing platforms 14 (as shown in FIG. 1). A virtual item shop component 61, similar to the virtual item shop component 28 (as shown in FIG. 1) may be configured to cause the user interface 60 to facilitate the presentation of views of a virtual shop 62 to users of the virtual space. The user interface 60 may provide a representation of an online game to the user. Within the representation of the online game a user may cause entry and/or selection of an indication of a desire to enter the virtual shop interface 62. In response to an interaction by the user of the online game, virtual item shop component 61 may be configured to effectuate presentation of a virtual shop interface 62 to users in conjunction with presentation of views of the online game and/or information relevant to the user. Virtual shop interface 62 may be configured to show the users game entity 64, primary virtual currency account balance 66, secondary virtual currency account balance 68, one or more items of the users virtual inventory 70, and/or other information related to the user.

Virtual shop interface 62 may be configured to facilitate presentations to users of offers to sell virtual items to the users on the client computing platforms 14 associated with the users, wherein the virtual items are usable within the game. FIG. 3 illustrates three offers to sell virtual items to a user of an online game. The presentation to users of an offer to sell virtual items may comprise an indication of the virtual item associated with the offer and an indication of the associated user cost. The associated user cost may be a primary virtual currency cost, a secondary virtual currency cost, a combination of primary and secondary virtual currencies cost, and/or other associated user costs.

A first offer 72 to sell virtual items includes a first associated user cost 74 of a primary virtual currency. In this illustration the user has chosen to accept the offer and the user has a primary virtual currency account balance 66 that exceeds the required cost of the virtual item. The associated user cost, may be an amount of primary or secondary virtual currency, real currency, one or more virtual items, and/or other items available to the user to exchange for the offer. Virtual currency may take any form, for example, virtual currency may be in the form of gems, stones, metals, credits, dollars, and/or any other representation of a virtual currency. A benefit level may be provided to the virtual item based on the associated user cost.

The virtual item shop component 61 may be configured to cause the virtual shop interface 62 to present a second offer 76 to sell virtual items having a second associated user cost 78 of a secondary virtual currency. The benefit level of the associated virtual items of the second offer 76 may be enhanced because the offer is in exchange for a secondary virtual currency. The virtual item may not be available for purchase without an amount of secondary currency. In this illustration the user has chosen to accept the offer. The user has a secondary virtual currency account balance 68 (21 units of secondary currency) that exceeds the required cost of the virtual item (e.g. 20 units of secondary currency). Thus the user may complete the transaction within virtual item shop component 61.

The virtual item shop component 61 may be configured to cause the virtual shop interface 62 to present a third offer 80 to sell virtual items having a third associated user cost of both a primary virtual currency 82 and a secondary virtual currency 84. The benefit level of the associated virtual items of the third offer 80 may be enhanced because the offer is in exchange for a cost of primary virtual currency 82 and a cost of secondary virtual currency 84. The virtual item may not be available for purchase without both an amount of primary virtual currency 82 and an amount of secondary currency 84 used in conjunction within the same transaction. In this illustration the user may not be able to accept the offer. Prior acceptance of other offers, insufficient primary virtual currency account balance 66 and/or secondary virtual currency account balance 68, and/or other restrictions may prevent a player from being able to accept the offer. The offer to sell may be displayed even though the user is unable to accept the offer in order to encourage the user to increase virtual currency account balances through additional purchases of virtual currency. Once the user has acquired a virtual currency balance that can be exchanged for the cost of the virtual item and if the secondary currency balance has not been decreased, the user may accept the offer and complete the exchange within virtual item shop component 61.

Referring back to FIG. 1, the offer configuration component 30 may be configured to facilitate the entry and/or selection of parameters associated with the offers to sell virtual items to multiple users and/or multiple virtual currencies of system 10. Such parameters may include an indication of the identity of the virtual items to be offered, an associated user cost for the offer in various forms of virtual currencies. The offer configuration component may enable a purchase of the required secondary virtual currency in exchange for primary virtual currency and/or fiat currency in order to enable the user to accept the offer. The offer configuration component may notify a user of the quantity and currency type required for a desired transaction based on the users virtual currency balance and the cost of the virtual item.

The server 12, client computing platforms 14, and/or External Resources 32 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 14, and/or External Resources 32 may be operatively linked via some other communication media.

A given client computing platform 14 may include one or more processors 16 configured to execute computer program components. The computer program components may be configured to enable an expert or user associated with the given client computing platform 14 to interface with system 10 and/or External Resources 32, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

The External Resources 32 may include sources of information, hosts and/or providers of virtual environments outside of system 10, external entities participating with system 10, and/or other resources. Some or all of the functionality attributed herein to External Resources 32 may be provided by resources included in system 10.

The server 12 may include Electronic Storage 34, one or more processors 16 and/or other components. The server 12 may include communication lines or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic Storage 34 may comprise electronic storage media that electronically stores information. The electronic storage media of Electronic Storage 34 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic Storage 34 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The Electronic Storage 34 may include one or more virtual storage resources (e.g., cloud storage, a virtual private network, and/or other virtual storage resources). Electronic Storage 34 may store software algorithms, information determined by processor 16, information received from server 12, information received from client computing platforms 14, and/or other information that enables server 12 to function as described herein.

Processor(s) 16 is configured to provide information processing capabilities in server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. Processor 16 may include a plurality of processing units. These processing units may be physically located within the same device, or processor 16 may represent processing functionality of a plurality of devices operating in coordination. The processor 16 may be configured to execute components 20, 22, 24, 26, 28, 30, and/or other components. Processor 16 may be configured to execute components 20, 22, 24, 26, 28, 30, and/or other components by software; hardware; firmware; some combination of software, hardware, and/or firmware; and/or other mechanisms for configuring processing capabilities on processor 16.

It should be appreciated that although components 20, 22, 24, 26, 28, 30 are illustrated in FIG. 1 as being co-located within a single processing unit, in implementations in which processor 16 includes multiple processing units, one or more of components 20, 22, 24, 26, 28, 30, and/or other components may be located remotely from the other components. The description of the functionality provided by the different components 20, 22, 24, 26, 28, 30, and/or other components described below is for illustrative purposes, and is not intended to be limiting, as any of components 20, 22, 24, 26, 28, 30, and/or other components may provide more or less functionality than is described. For example, one or more of components 20, 22, 24, 26, 28, 30, and/or other components may be eliminated, and some or all of its functionality may be provided by other ones of 20, 22, 24, 26, 28, 30, and/or other components. As another example, processor 16 may be configured to execute one or more additional components that may perform some or all of the functionality attributed herein to one of components 20, 22, 24, 26, 28, 30, and/or other components.

Figure 4:
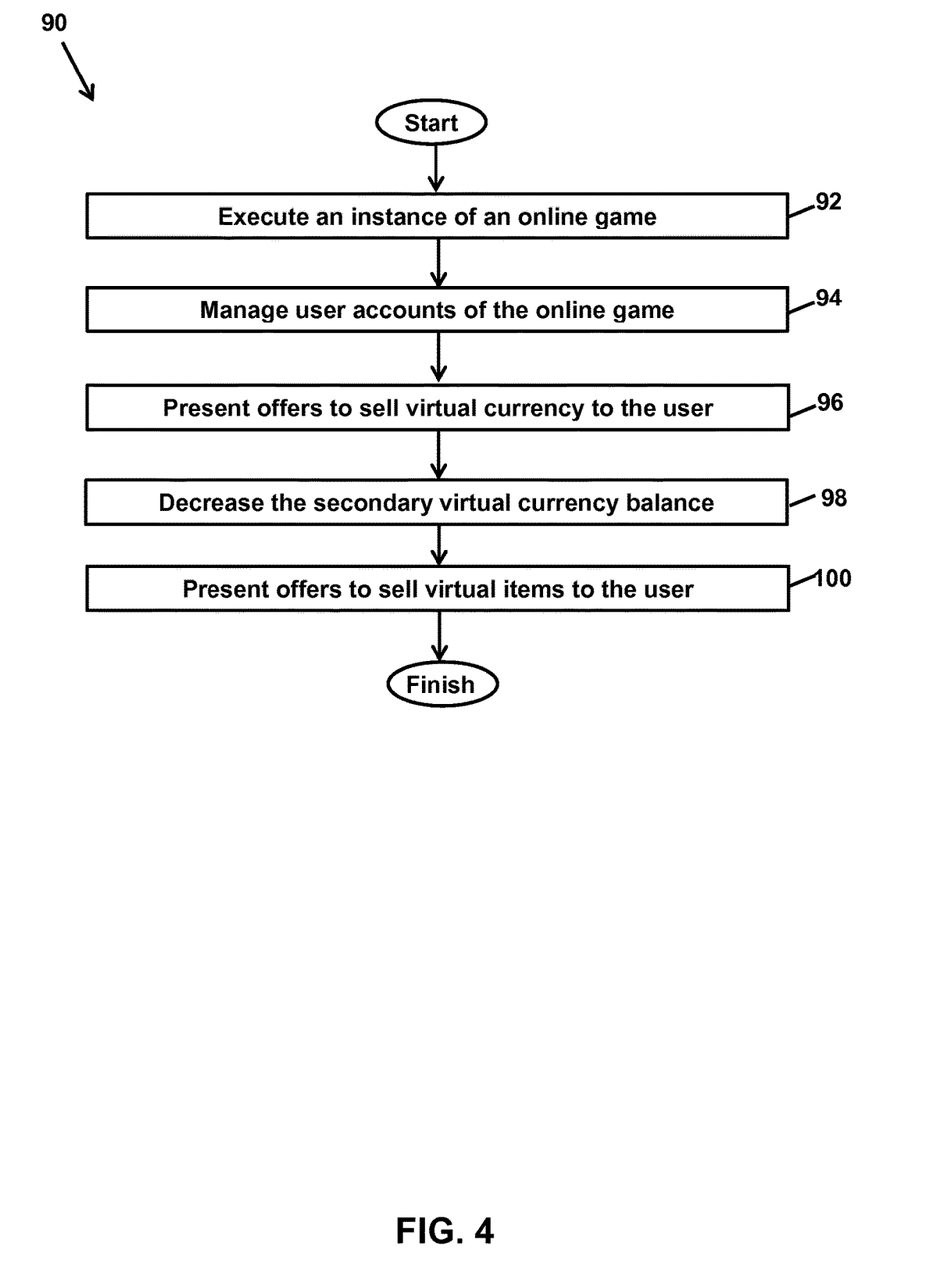
FIG. 4 illustrates a method for providing virtual items through virtual purchases with a decreasing secondary virtual currency, in accordance with one or more methods.

FIG. 4 illustrates a method 90 to distribute a secondary virtual currency with purchases of a primary virtual currency to users of a virtual space. The operations of method 90 presented below are intended to be illustrative. In some embodiments, method 90 may be accomplished with one or more additional operations not described, and/or without one or more of the operations discussed. Additionally, the order in which the operations of method 90 are illustrated in FIG. 4 and described below is not intended to be limiting.

In some implementations, one or more steps of method 90 may be implemented using one or more processing devices (e.g., a server, a client, a digital processor, an analog processor, a digital circuit designed to process information, an analog circuit designed to process information, a state machine, and/or other mechanisms for electronically processing information). The one or more processing devices may include one or more devices executing some or all of the operations of method 90 in response to instructions stored electronically on an electronic storage medium. The one or more processing devices may include one or more devices configured through hardware, firmware, and/or software to be specifically designed for execution of one or more of the operations of method 90.

At an operation 92, an instance of an online game may be executed. The online game may effectuate transmission of information related to the instance of the online game to client computing platforms. Views of the online game may be presented to a user on client computing platforms. In some implementations, operation 92 may be performed by a game component the same as or similar to game component 20 (shown in FIG. 1 and described herein).

At an operation 94, user accounts of the online game may be managed. The user accounts may include inventories of virtual items and/or virtual currency balances associated with individual users. The virtual currency balances may include primary virtual currency balances and/or the secondary virtual currency balances. Virtual currency accounts may include an account associated with an individual user. The account may include a primary virtual currency balance and a secondary virtual currency balance. In some implementations, operation 94 may be performed by a user component the same as or similar to user component 22 (shown in FIG. 1 and described herein).

At an operation 96, offers to sell virtual currency may be presented to the user. Offers to sell virtual currency may include an offer to sell virtual currency that includes a primary virtual currency amount. Acceptance of the offer by the user may result in the primary virtual currency amount being added to the users primary virtual currency balance and a secondary virtual currency amount being added to the users secondary virtual currency balance. In some implementations, operation 96 may be performed by a virtual currency shop component the same as or similar to virtual currency shop component 24 (shown in FIG. 1 and described herein).

At an operation 98, the secondary virtual currency balances may be decreased. The secondary virtual currency balances may decrease over time, such that subsequent to an addition of the secondary virtual currency amount to the users secondary virtual currency balance, the first secondary virtual currency balance is reduced over time. In some implementations, operation 98 may be performed by a currency balance adjustment component the same as or similar to currency balance adjustment component 26 (shown in FIG. 1 and described herein).

At an operation 100, a virtual store interface may be presented to the user. The virtual store interface may include offers to sell virtual items and/or sets of virtual items that are usable in the online game. The offers to sell virtual item(s) for virtual currency may include an offer that specifies a cost in the secondary virtual currency. The offer to sell virtual item(s) for virtual currency may include an offer that specifies a cost in the primary virtual currency. In some implementations, operation 100 may be performed by a virtual items shop component the same as or similar to virtual items shop component 28 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for providing virtual items through virtual purchases with a decreasing secondary virtual currency, the system comprising:
one or more physical processors configured by machine readable instructions to:
execute an instance of an online game to facilitate user participation of users in the online game by effectuating transmission of information related to the instance of the online game to client computing platforms on which views of the online game are presented to users;
manage user accounts, wherein the user accounts include inventories of virtual items and virtual currency balances associated with individual users, the virtual currency balances including primary virtual currency balances and the secondary virtual currency balances, the accounts including a first account associated with a first user, the first account including a first primary virtual currency balance and a first secondary virtual currency balance;
effectuate presentation of offers to sell virtual currency to the users, the offers to sell virtual currency including a first offer to sell virtual currency that includes a primary virtual currency amount, wherein in response to acceptance of the first offer by the first user, the primary virtual currency amount is added to the first primary virtual currency balance and a secondary virtual currency amount that is gifted to the first user is added to the first secondary virtual currency balance, wherein the secondary virtual currency amount that is gifted to the first user is based on the primary virtual currency amount purchased by the first user via acceptance of the first offer;
decrease secondary virtual currency balances over time, such that subsequent to addition of the secondary virtual currency amount to the first secondary virtual currency balance, the first secondary virtual currency balance is reduced over time; and
effectuate presentation of a virtual store interface to the users, the virtual store interface including offers to sell virtual items and/or sets of virtual items that are usable in the online game for virtual currency, the offers to sell virtual items comprising (i) a first offer to sell virtual items that specifies a cost in the secondary virtual currency, and (ii) a second offer to sell virtual items that specifies a cost in the primary virtual currency, wherein the virtual items are made available to the player more quickly when the secondary virtual currency is used to purchase the virtual items, wherein virtual items purchased by the user are provided to the inventory of the user within the online game and are usable by the user within the online game to provide an in-game benefit to one or more of strength, power, skill, character ability, defensive, offensive, or military characteristics of a user's in-game entity.

2. The system of claim 1, wherein the offer to sell virtual currency is made for fiat currency.

3. The system of claim 1, wherein the offer to sell virtual currency is made for virtual currency.

4. The system of claim 1, wherein the offer to sell virtual currency is made for real world consideration.

5. The system of claim 1, wherein the offer to sell virtual currency displays only an offer to sell primary virtual currency and the secondary virtual currency is presented to the player after the sale.

6. The system of claim 1, wherein the offer to sell virtual currency provides a set primary virtual currency and the secondary virtual currency is a percentage of the primary virtual currency purchased.

7. The system of claim 1, wherein the secondary virtual currency is decremented linearly as a function of time.

8. The system of claim 1, wherein the secondary virtual currency is decremented exponentially as a function of time.

9. The system of claim 1, wherein the secondary virtual currency is decremented as a function of real world time.

10. The system of claim 1, wherein the secondary virtual currency is decremented as a function of game space time.

11. The system of claim 1, wherein the offer to sell a first set of one or more virtual items is only offered in the secondary virtual currency.

12. The system of claim 1, wherein the offer to sell a new virtual item and/or a new set of one or more virtual items is only available in the secondary virtual currency.

13. The system of claim 1, wherein in response to acceptance by the first user of an offer to sell virtual items, an amount of secondary virtual currency is removed from the secondary virtual currency balance of the first user and the virtual item and/or sets of virtual items are added to the first users inventory.

14. A method for providing virtual items through virtual purchases with a decreasing secondary virtual currency, the method being implemented in a computer system including one or more physical processors and storage media storing machine-readable instructions, the method comprising:
executing an instance of an online game, wherein the online game effectuates transmission of information related to the instance of the online game to client computing platforms on which views of the online game are presented to a user;
managing user accounts, wherein the user accounts include inventories of virtual items and virtual currency balances associated with individual users, the virtual currency balances including primary virtual currency balances and the secondary virtual currency balances, the accounts including a first account associated with a first user, the first account including a first primary virtual currency balance and a first secondary virtual currency balance;
presenting offers to sell virtual currency to the users, the offers to sell virtual currency including a first offer to sell virtual currency that includes a primary virtual currency amount, wherein in response to acceptance of the first offer by the first user, the primary virtual currency amount is added to the first primary virtual currency balance and a secondary virtual currency amount that is gifted to the first user is added to the first secondary virtual currency balance, wherein the secondary virtual currency amount that is gifted to the first user is based on the primary virtual currency amount purchased by the first user via acceptance of the first offer;
decreasing the secondary virtual currency balances over time, such that subsequent to addition of the secondary virtual currency amount to the first secondary virtual currency balance, the first secondary virtual currency balance is reduced over time; and presenting a virtual store interface to the users, the virtual store interface including offers to sell virtual items and/or sets of virtual items that are usable in the online game for virtual currency, the offers to sell virtual items comprising (i) a first offer to sell virtual items that specifies a cost in the secondary virtual currency, and (ii) a second offer to sell virtual items that specifies a cost in the primary virtual currency, wherein the virtual items are made available to the player more quickly when the secondary virtual currency is used to purchase the virtual items, wherein virtual items purchased by the user are provided to the inventory of the user within the online game and are usable by the user within the online game to provide an in-game benefit to one or more of strength, power, skill, character ability, defensive, offensive, or military characteristics of a user's in-game entity.

15. The method of claim 14, wherein the offer to sell virtual currency is made for fiat currency.

16. The method of claim 14, wherein the offer to sell virtual currency is made for virtual currency.

17. The method of claim 14, wherein the offer to sell virtual currency is made for real world consideration.

18. The method of claim 14, wherein the offer to sell virtual currency displays only an offer to sell primary virtual currency and the secondary virtual currency is presented to the player after the sale.

19. The method of claim 14, wherein the offer to sell virtual currency provides a set primary virtual currency and the secondary virtual currency is a percentage of the primary virtual currency purchased.

20. The method of claim 14, wherein the secondary virtual currency is decremented linearly as a function of time.

21. The method of claim 14, wherein the secondary virtual currency is decremented exponentially as a function of time.

22. The method of claim 14, wherein the secondary virtual currency is decremented as a function of real world time.

23. The method of claim 14, wherein the secondary virtual currency is decremented as a function of game space time.

24. The method of claim 14, wherein the offer to sell a first set of one or more virtual items is only offered in the secondary virtual currency.

25. The method of claim 14, wherein the offer to sell a new virtual item and/or a new set of one or more virtual items is only available in the secondary virtual currency.

26. The method of claim 14, wherein in response to acceptance by the first user of an offer to sell virtual items, an amount of secondary virtual currency is removed from the secondary virtual currency balance of the first user and the virtual item and/or sets of virtual items are added to the first users inventory.

* * * * *